United States Patent [19]

Fabris et al.

[11] 3,755,211

[45] Aug. 28, 1973

[54] LATEX REINFORCED FLEXIBLE POLYURETHANE FOAM

[75] Inventors: Hubert J. Fabris, Akron; Edwin M. Maxey, Kent, both of Ohio

[73] Assignee: The General Tire & Rubber Company, Akron, Ohio

[22] Filed: Oct. 7, 1971

[21] Appl. No.: 187,527

[52] U.S. Cl. .......................................... 260/2.5 BE
[51] Int. Cl. ........................................... C08g 22/44
[58] Field of Search ............................... 260/2.5 BE

[56] References Cited
UNITED STATES PATENTS
2,993,013  7/1961  Wolfe ................................. 260/827

Primary Examiner—Donald E. Czaja
Assistant Examiner—M. J. Welsh
Attorney—Bosworth, Sessions & McCoy

[57] ABSTRACT

This invention comprises the production of low density flexible polyurethane foams having improved load carrying capacity by adding to the unfoamed mixture, comprising a polyhydroxy compound, an organic polyisocyanate and water, a polymer in the form of an unfoamed latex of about 30 to 65 percent solids content, the latex polymer having a glass transition temperature of at least 50° C. and having a particle size in the range of from about 200 to 800 angstroms, any other latex polymer particles outside said range being present in minor amounts.

11 Claims, No Drawings

LATEX REINFORCED FLEXIBLE POLYURETHANE FOAM

BACKGROUND OF THE INVENTION

Polyurethane foams that are conventionally prepared from the reaction between an organic polyol, an organic polyisocyanate and water generally exhibit many outstanding properties such as good resilience, excellent chemical inertness, and high tensile strength, but they are limited in some properties such as their load bearing capacity, i.e., the amount of weight it takes to cause the foam to deflect a given amount. Conventional methods of improving the load bearing properties of these foams include, for example, increasing the amount of organic polyisocyanate added to the reaction mixture to provide more crosslink sites and ultimately a higher crosslink density. Such a method involves higher material costs and increases the reaction exotherm giving rise to a greater risk of fire on the production line. Another method is to use aromatic diamines and/or polyamines in the reaction mixture to provide more sites for the development of crosslinks. This latter practice is seldom used because aromatic di- or poly- amines are expensive. Reinforcing and stiffening fillers are many times dispersed in the viscous foam reaction mixture to increase physically the density and load bearing properties of the foam. However, dispersing these dry fillers uniformly in the viscous mixture involves substantial mixing costs in terms of time and equipment. Another method comprises adding elastomeric latices to the unfoamed reaction mass as shown in U.S. Pat. No. 2,993,013, but the load bearing properties have not been found to be significantly improved in very low density foams, i.e., 1–3 pounds per cubic foot (pcf) density.

SUMMARY OF THE INVENTION

This invention is an improved method of increasing the load bearing properties of low density flexible polyurethane foams by the incorporation into the polyurethane reaction mixture, prior to foaming, of from about 1 to 20, preferably about 2 to 10, parts by weight per 100 parts of the polyhydroxy component of one or more polymers each having a glass transition temperature (Tg) of at least 50° C., said polymer or polymers being added in the form of unfoamed latex the solid content of which is no more than about 65 percent by weight and in which the effective polymer particles have a maximum linear dimension of no more than about 800° A.

This method has many unique benefits. First, the added polymer increases the load bearing capacity of the foam, thereby giving rise to new uses for polyurethane foams. Second, the water in the latex may be used in lieu of the water separately added to the foam formulation thereby utilizing more of the latex than merely the polymer content. As a separate embodiment of this invention, latices of polymers having high Tg are added to the unfoamed reaction mass after which some of the water is stripped from the mass thereby enabling incorporation of large quantities of polymers in the mass prior to development of the polyurethane foam. Third, mixing of the polymeric latex is easier than dispersing dry fillers thereby lowering the cost of blending these particles into the unreacted mass. Still further, these latices are significantly lower in cost than organic polyisocyanates, aromatic diamines and most dry reinforcing fillers.

The main object of this invention is to provide low density flexible polyurethane foams or cellular polyurethane products having improved load bearing properties. Another object is to provide such foams or products by the simple addition of comparatively inexpensive latices into the unfoamed reaction mass or into various components or moieties of the reaction mass prior to final mixing, wherein the improvement in properties is accomplished and at a lower cost than is conventionally encountered with other processes for improving load bearing characteristics. These and other objects which are apparent from the following description of the preferred embodiments and the examples are satisfied by this invention.

DESCRIPTION OF THE PREFERRED EMBODIMENTS

This invention pertains to flexible polyurethane foams and to flexible cellular products made therefrom. Although polyurethanes may be made by reacting an aliphatic diamine and the bischloroformate of a glycol wherein the bischloroformate is obtained by the reaction between phosgene and the glycol, this invention is primarily applicable to polyurethane foams and flexible cellular products produced therefrom that are made from the interreaction of a polyhydroxy compound, especially a polyetherpolyl, an organic polyisocyanate and water. Other ingredients may optionally be added such as catalysts, auxiliary blowing agents, fillers, flame retardants and dyes.

A complex series of reactions is involved in the production of the polyurethane foam by this latter method. Generally, the polyhydroxy compound (either a polyether polyol or a polyester polyol) is reacted with some of the polyisocyanate to form a chain-extended polyurethane, and more of the isocyanate reacts with water to form carbamic acid that breaks down to form a primary amine and carbon dioxide. The auxiliary blowing agent (if any) and the carbon dioxide expand the polyurethane into a cellular structure or foam, and the primary amine formed from the polyisocyanate-water reaction reacts with further polyisocyanate to form a di-substituted urea which in turn reacts with more isocyanate to form cross-linking biuret structures.

The low density, i.e., 1–5 pounds per cubic foot (pcf) density, polyurethane foams of this invention are "flexible" foams as opposed to "semi-rigid" and "rigid" foams. The flexibility of these foams is not specifically definable because the formulation may be changed incrementally to provide an incremental increase or decrease in the flexibility of the foam. As used herein, the term "flexible" will denote the type of polyurethane foam that is considered flexible by those skilled in the art and as described in the literature, e.g., *POLYURETHANES*, B.A. Dombrow, Reinhold Publishing Corporation, New York (1965).

The polyhydroxy compound usable herein can be either a polyether polyol or a polyester polyol or a combination thereof, each polyol having a molecular weight from about 1,000 to 6,000/

A wide range of polyether polyols can be used in making the flexible polyurethane foams such as diols, triols and tetrols. Polyether diols are generally made by reacting an alkylene oxide such as propylene oxide with a strong base such as potassium hydroxide. Polyethers having a highly branched chain network are also usable. Such highly branched chain polyethers are readily prepared from alkylene oxides and initiators having a functionality greater than 2. Highly branched polyethers make possible cross-linking without the interreaction of urea or uethane groups with the isocyanate groups. This has the advantage of making a larger proportion of the isocyanate used available for the evolution of carbon dioxide and a reduction of the overall amount of isocyanate that is required in the preparation of the foamed polymer.

The higher functional initiators that are useful with the alkylene oxides described above include polyols, polyamines and amino alcohols having a total of three or more reactive hydrogen atoms as in hydroxyl and primary or secondary amino groups. Suitable polyols include triols, such as glycerol, trimethylolpropane, butanetriols, hexanetriols, trimethylolphenol, tris(hydroxphenyl)propane, tris(hydroxyxylyl)propane, novolaks and trialkanol-amines; various tetrols, such as erythritol and pentaerythritol; pentols; hexols, such as dipentaerythritol and sorbitol, as well as alkyl glucosides, carbohydrates, polyhydroxy fatty acid esters such as castor oil, and polyoxy alkylated derivatives or polyfunctional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, ethanolamine, diethanolamine, triethanolamine, isopropanolamine, diisopropanolamine, triisopropanolamine, 2-(2-amino-ethylamino) ethanol, 2-amino-2(hydroxymethyl)-1,3-propanediol, diethylenetriamine, triethylenetetramine, urea and urea-formaldehyde polymers as well as various aryl polyamines, such as 4,4',4''-methylidenetrianiline.

Another means of increasing the degree of branching, when employing linear polyethers, is to include a highly functional initiator, as described above, in the mixture charged to the reaction. Preferred polyethers of the branched type are those prepared by adding propylene oxide to various diols, triols, tetrols and polyols as starters to produce adducts of various molecular weights. Polyethers which deserve special mention are the polypropylene oxide adducts to 1,2,6-hexanetriol and glycerol in which the polypropylene oxide has a molecular weight in the range of 1,000 to 6,000.

The amount of highly functional initiator normally employed with the linear type polyethers described above is an amount in the range of from about 0.5 to about 4.0 percent by weight of said initiator based on the weight of polyether charged to the reaction.

Generally, the polyethers suitable for employment can be conveniently characterized as normally liquid (although meltable solid polyethers are not exluded), pourable polyethers having viscositites in the range of from 50 centipoises to about 500,000 centipoises at room temperature (i.e., 25° C.) and preferably having molecular weights in the range of from 1,000 to 6,000.

Polyester polyols are formed from the condensation of one or more polyhydric alcohols with one or more polycarboxylic acids. As a practical matter, for flexible foams the polyhydric alcohols include primarily ethylene glycol, diethylene glycol and/or 1,3-butanediol with, optionally, trimethylolpropane and/or hexanetriol, and the principal polycarboxylic acid is adipic acid. However, the other polyhydric alcohols and other plycarboxylic acids can be incorporated in the polyester polyols which can be used in this invention.

A wide variety of polyisocyanate compounds can be used in the polyurethane reaction. Examples of some of these include toluene-2,4-diisocyanate, 1,5-naphthalenediisocyanate, cumeme-2,4-diiocyanate, 4-methoxyl-1,3-phenylenediisocyanate, 4-chloro-1,3-phenylenediisocyanate, 4-bromo-1,3-phenylenediisocyanate, 4-ethyoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,-3-dimethyl-4,4'-diisocyanatodiphenylmethane, 2,6-dimethyl-4,4'- diisocyanatodiphenyl, 2,4-diisocyanatostilbene, 3,3'-dimethyl- 4,4'-diisocyanatodiphenyl, 1,4-anthracenediisocyanate, 2,5- fluroenediisocyanate, 1,8-naphthalenediisocyanate, 2,6-diisocyanatobenzofuran and 2,4,6-toluenetriisocyanate. It is to be understood that mixtures of two or more of these polyisocyanates can be employed. Aromatic isocyanates are preferred, particularly toluene diisocyanate.

Catalysts are added to accelerate the different reactions. The chain-extension reaction, where the polyol reacts with the isocyanate to produce the polyurethane, is accelerated by tertiary amines and metalorganic catalysts. The tertiary amines also catalyze the gas-forming isocyanate-water reaction. Alkyl morpholines contribute certain physical properties to the foam such as tear resistance and tensile strength. Suitable tertiary amines are well knwon and include triethylene diamine, tetramethylbutane diamaine, triethylamine, N-methyl morpholine, N-ethyl morpholine, diethyl ethanolamine, N-coco morpholine, 1-methyl-4- dimethylamino ethyl piperazine, 3-methoxy-N-dimethylpropyl amine, N-N-diethyl-3-diethylamino propyl amine and dimethyl benzyl amine. The metal organic catalysts are also well known, tin catalysts being generally preferred. Examples of such catalysts include dibutyl tin dilaurate, stannous chloride, dibutyl tin di-2-ethyl hexoate, stannous octoate and stannous oleate. A surface active agent may be used to stabilize the cell structure during foam rise and to prevent slumping, collapsing and ripping of the cells. A common class of agent comprises polyoxyalkylene polysiloxane block copolymers which are now well known in the art.

The latices that are incorporated into the unfoamed reaction mass pursuant to this invention comprise unfoamed latices of up to about 65 percent solids of polymers that have a glass transition temperature (Tg) greater than about 50° C. and that have polymer particles with a maximum size of about 800 angstroms. These polymeric latices include, for example, polymethylmethacrylate latices, polystyrene latices, vinyl chloride-polyacrylate copolymer latices.

The glass transistion temperature (Tg) of the polymers must be greater than 50° C. in order for them to improve the load bearing capacity of the polyurethane foam. Polymers having glass transition temperatures below 50° C. do not provide an amount of load bearing improvement sufficient to justify the use of that polymer in the polyurethane foam. As used herein the term "glass transition temperature" is the temperature above which a polymer loses its hardness and takes on more rubbery or leather-like properties. There is no maximum Tg for the latex polymers which are operable in this invention except the temperatures of decomposition for the respective polymers.

The polymeric latex can be incorporated into the unfoamed reaction mixture or any non-reactive moiety thereof prior to having the mixture foam into a cellular structure. Latices containing up to about 65 percent by weight solids are sufficiently dispersible to be used in this invention. The solids content can be as low as 10 percent or lower, and such low solids latices can be advantageous where the polymer particles are about 200 angstoms, but the use of such dilute latices generally necessitates the subsequent stripping of water from the system before initating the foaming reaction. Therefore, it is preferable that the latices have a solids content of at least about 30 percent by weight.

The subject latex or latices are employed in this invention in amounts sufficient to introduce from about 1 to 20, preferably 2 to 10, parts by weight of the desired defined polymer into the polyurethane reaction system per 100 parts by weight of the polyhydroxy compound. With a latex containing from 30 to 65 percent solids it is preferred to use between about 5 to 40 parts by weight of latex per one hundred parts by weight of polyhydroxy compound to achieve a significant improvement in the load carrying capacity of the foam. For instance, the unfoamed polymeric latex can be added to the polyhydroxy compound prior to blending that compound with the water and isocyanate. Unique in this invention also is the use of the unfoamed latex to add both polymer particles to the reaction mixture and to add water in lieu of the separate water stream necessary for reaction with the isocyanate to produce carbon dioxide.

The particle size of the polymer in the latex should be no greater than about 800 angstroms. In other words, the maximum linear dimension of any latex particle should be about 800 angstroms. For polymer particles which are generally assumed to be approximately spherical in configuration the maximum particle diameter should be 800 angstroms. At sizes larger than 800 angstroms the load improving ability of the polymer begins to rapidly deteriorate. The minimum particle size is governed only by the minimum particle size for a satisfactory latex of the polymer or polymers in the latex suspension. The polymer particle size in most known latices of the type used in this invention is generally no smaller than about 200 angstroms, and this is therefore a preferred minimum size limitation. It should be noted that polymer particles ouside the specified size range can also be present in minor amounts without any significant effect on the operability of this invention, but the quantities of defined polymers added in latex form are specified as the effective amounts of polymer particles effective for the purposes of this invention.

A separate embodiment of this invention is the addition of larger quantities of hard polymeric latex such as 15 to 40 parts by weight per hundred parts by weight of polyhydroxy compound with subsequent stripping of the water from the unfoamed reaction mixture or component to which the latex is added such as by vacuum stripping which is a conventional practice. By this manner, a larger proportion of polymer particles are evenly distributed throughout the viscous reaction mixture so as to improve still further the load bearing properties of the foam without the attendant difficulties of an excess amount of water present to use up expensive isocyanate. This embodiment permits a large quantity of polymeric latex particles to be evenly distributed throughout the reaction mixture at lower mixing costs than would normally be incurred if the same polymer particles were to be distributed in the dry state throughout the reaction mixture. The latex, therefore, performs the function of permitting easier blending of latex particles into polyurethane foam reaction mixtures at concomitantily lower blending costs.

The polymeric latices useful in this invention are commercially available hard polymeric latices such as are normally produced by emulsifiying a polymerizable monomer or a mixture of such monomers in water using a surface active agent and then causing homopolymerization or copolymerization of the emulsified monomer or monomers by the use of various water soluble catalysts such as ammonium persulfate. These latices need not be foamed or otherwise modified as they are added to the viscous urethane-forming reaction mixture prior to the formation of the polyurethane foam.

The following examples are illustrative of the best presently-known methods of practicing this invention and are not to limit the invention, the scope of which is properly delineated in the claims. Unless otherwise noted, all quantitative measurements are by weight.

EXAMPLE I

A typical water-blown low density polyurethane foam was produced by hand-mixing the ingredients shown below in Table I. The toluene diisocyanate employed was a mixture of 2,4-toluene diisocyanate and 2,6-toluene diisocyanate in a ratio of 4:1. The mixing was done by adding the materials in the order shown. Sample A contained 4 parts of water whereas Sample B contained 6.5 parts of a 38 percent total solids (B) high molecular weight polymethylmethacrylate latex wherein the water content of the latex was 4 parts. The size of the latex particles ranged from 200 to 300 angstroms and the glass transition temperature of the polymer was 103° C. Each sample was hand-mixed, was poured into a cardboard dairy container, was permitted to freely expand at room temperature and was thereafter cured for 60 minutes at 250° F. The samples were then tested for density, tensile strength, elongation, 25 percent compression load deflection and 65 percent compression load deflection. The test data appear below in Table I. The compression load deflection (CLD) test is wellknown in the polyurethane foam art (ASTM T1564) as is the load or SAC factor (ratio of 65 percent CLD to 25 percent CLD) so that its description is not necessary here.

TABLE I

| Ingredients | Sample A | Sample B |
|---|---|---|
| 3000mol wt. polyoxypropylene triol | 100 parts | 100 parts |
| stannous octoate | 0.35 | 0.35 |
| triethylene diamine (Dabco LV33) | 0.20 | 0.20 |
| silicone surfactant (Carbide L-540) | 1.00 | 1.00 |
| water | 4.00 | - |
| polymethylmethacrylate latex (38% solids) | - | 6.5 |
| toluene diisocyanate | 52 | 52 |
| Properties | | |

| | | |
|---|---|---|
| density (pcf) | 1.58 | 1.58 |
| tensile strength (psi) | 12.3 | 13.7 |
| elongation (%) | 175 | 185 |
| CLD loads, pounds (4" X4" X2" sample) | | |
| 25% deflection | 4.7 | 7.4 |
| 65% deflection | 9.5 | 14.5 |
| SAC factor | 2.02 | 1.97 |

This example shows that the addition of the defined 38 percent solids polymethylmethacrylate latex in an amount wherein the water in the latex equals the amount of water of a non-latex treated water-blown foam of identical composition results in significantly improved CLD loads (58 percent increase at 25 percent deflection and 53 percent increase at 65 percent deflection) while not deteriorating the SAC factor.

EXAMPLE II

A water-blown polyurethane foam of formulation similar to that in Example I was prepared according to the formulation shown below in Table II wherein the 4 parts of water of Sample C was replaced respectively in Sample D with 9 parts of a vinyl chloride-acrylate copolymer latex of 56 percent total solids, 81° C. glass transition temperature, and a particle size range from 500 to 800 angstroms, and in Sample E with 7.7 parts of a polystyrene latex of 49.5 percent total solids, 85° C. glass transition temperature, and a particle size range from 200 to 800 angstroms. These hand-mixed foams were made and cured in the same manner as described in Example I and the same tests were conducted on the cured samples. The test data are shown below in Table II.

TABLE II

| Ingredients | Sample C | Sample D | Sample E |
|---|---|---|---|
| 3000 mol wt. polyoxypropylene triol | 100 parts | 100 parts | 100 parts |
| stannous octoate | 0.35 | 0.35 | 0.35 |
| triethylene diamine | 0.20 | 0.20 | 0.20 |
| silicone surfactant | 1.00 | 1.00 | 1.00 |
| water | 4.00 | - | - |
| vinyl chloride-acrylate latex (56% TS) | - | 9 | - |
| polystyrene latex (49.5% TS) | - | - | 7.7 |
| toluene diisocyanate | 52 | 52 | 52 |
| Properties | | | |
| density (pcf) | 1.59 | 1.41 | 1.67 |
| tensile strength (psi) | 12.3 | 14.6 | - |
| elongation (%) | 175 | 200 | - |
| CLD loads, pounds (4"X4"X2" sample) | | | |
| 25% deflection | 4.7 | 5.5 | 6.2 |
| 65% deflection | 9.5 | 12.0 | 12.4 |
| SAC factor | 2.06 | 2.18 | 2.00 |

This example further shows the unique benefits of the invention wherein the water of the formulation is replaced by an equal amount of water from a hard polymeric latex.

EXAMPLE III

To 500 grams of a 3,000 mol wt. polyoxpropylene triol was added 100 grams of a high molecular weight polymethylmethacrylate latex of 38 percent total solids, 103° C. glass transition temperature and particle size of 200 to 300 angstroms. This mixture had an initial water content of 10.3 percent by weight. The master mixture was thereafter vacuum stripped with agitation at 8 millimeters pressure at temperatures between 16° to 30° C. After approximately 1 hour the stripping was suspended, and the percentage of water in the mixture was determined by a standard Karl Fisher water determination to be 5.63 percent. This latex-doped triol or master mixture was then formulated with other ingredients according to the formulation shown below in Table III. Hand-mixed foams were prepared from these formulas, foamed and cured as described in Example I. Each sample was thereafter tested for physical properties, and the test data are shown below in Table III.

TABLE III

| Ingredients | Sample F | Sample G |
|---|---|---|
| master mixture (5.63% water) | - | 72.5 parts |
| 3000 mol wt. polyoxpropylene triol | 100 parts | 36 |
| stannous octoate | 0.35 | 0.35 |
| triethylene diamine | 0.20 | 0.20 |
| silicone surfactant | 1.00 | 1.00 |
| water | 4.0 | - |
| toluene diisocyanate | 52 | 52 |
| Properties | | |
| density (pcf) | 1.62 | 1.59 |
| tensile strength (psi) | 11.3 | 14.6 |
| elongation (%) | 220 | 210 |
| CLD loads, pounds (4"X4"X2" sample) | | |
| 25% deflection | 5.0 | 5.3 |
| 65% deflection | 10.5 | 13.5 |
| SAC factor | 2.10 | 2.55 |

This example shows the beneficial results of adding a rather large amount of hard polymeric latex to one of the foam-forming reaction moieties and thereafter stripping some of the water to reduce it to a workable level. As the example shows, by this method, the 25 percent CLD load was increased 6 percent while the 65 percent CLD load was increased 28 percent.

EXAMPLE IV

Master mixtures prepared as in Example III but vacuum stripped to water contents of 0.67 and 0.63 percent by weight respectively were formulated with and without further latex addition as shown below in Table IV. The samples were foamed and cured identically as described in the Example I. The physical properties were determined and are listed in Table IV.

TABLE IV

| Ingredients | Sample H | Sample J | Sample K |
|---|---|---|---|
| master mixture (0.67% water) | - | 108 parts | - |
| master mixture (0.37% water) | - | - | 108 parts |
| 3000 mol wt. polyoxypropylene triol | 100 parts | - | - |
| stannous octoate | 0.35 | 0.35 | 0.35 |
| triethylene diamine | 0.20 | 0.20 | 0.20 |
| silicone surfactant | 1.00 | 1.00 | 1.00 |
| water | 4.00 | - | - |
| polymethylmethacrylate latex (38% solids) from Example I | - | - | 5.5 |
| toluene diisocyanate | 52 | 52 | 52 |
| Properties | | | |
| density (PCF) | 1.62 | 1.54 | 1.79 |
| tensile strength (psi) | 11.3 | 16.1 | - |
| elongation (%) | 220 | 205 | - |
| CLD laods, pounds (4"X4"X2" sample) | | | |
| 25% deflection | 5.0 | 6.4 | 7.6 |
| 65% deflection | 10.5 | 16.4 | 21.7 |
| SAC factpr | 2.10 | 2.50 | 2.85 |

Example V

To demonstrate the specific achievements of hard polymeric latices, i.e., those having a glass transition temperature of 50° C. or higher, in comparison with polymeric latices wherein the polymer has a glass transition temperature of less than 50° C., a series of polyurethane foam samples were prepared according to the formulations shown below in Table V. To the formulations were added various quantities of hard and soft polymeric latices. The foams were hand-mixed and permitted to freely expand in a cardboard dairy container and thereafter subjected to a curing cycle of 250° F. for 60 minutes. The CLD load data is listed below.

TABLE V

| Ingredients | Samples: L | M | N | O |
|---|---|---|---|---|
| 3000 mol wt. polyether triol | 100 parts | 100 parts | 100 parts | 100 parts |
| stannous octoate | 0.35 | 0.35 | 0.35 | 0.35 |
| triethylene diamine | 0.20 | 0.20 | 0.20 | 0.20 |
| silicone surfactant | 1.00 | 1.00 | 1.00 | 1.00 |
| water | 4.00 | - | - | - |
| acrylic latex (38% solids, Tg=103°C., particle size 200° to 300° A) | - | 6.7 | - | - |
| 77% Butadiene/23% Styrene latex (50% solids, Tg× −64 to −59°C.; particle size 2000 °A) | - | - | 8.0 | - |
| Vinyl pyridine-butadiene latex (50% solids, Tg= −60° to −40°C; particle size 750 to 800°A) | - | - | - | 8.0 |
| Properties | | | | |
| density (pcf) | 1.58 | 1.59 | 1.54 | 1.59 |
| CLD loads, pounds (4"×4"×2" sample) | | | | |
| 25% deflection | 5.8 | 7.4 | 4.9 | 5.0 |
| 65% deflection | 11.0 | 14.5 | 10.3 | 11.8 |

This example shows that the use of polymeric latices wherein the glass transition temperature of the polymer is less than 50° C. does not produce the improvement in load carrying capacity or CLD load data that is produced by polymers having glass transition temperatures above 50° C.

We claim:

1. In the process of preparing flexible cellular products from:
   a an organic polyisocyanate,
   b water and
   c a polyhydroxy compound having a molecular weight from about 1,000 to 6,000 and being selected from the group consisting of polyester polyols and polyether polyols;
the step which comprises incorporating into the reaction mixture, prior to the formation of the cellular product, from about 1 to 20 parts by weight per one hundred parts of polyhydroxy compound of polymer having a glass transition temperature of at least 50° C., said polymer being in the form of an unfoamed latex of up to about 65 percent solids content, said latex polymer having a particle size in the range of from about 200 to 800 angstroms, any other latex polymer particles outside said range being present in minor amounts.

2. The process of claim 1 including a chain-extension reaction catalyst with said organic polyisocyanate, said water, and said polyhydroxyl compound.

3. The process of claim 1 including a gas reaction catalyst with said organic polyisocyanate, said water, and said polyhydroxy compound.

4. The process of claim 1 including a foam stabilizer with said organic polyisocyanate, said water and said polyhydroxy compound.

5. The process of claim 1 wherein said polymer is selected from the group consisting of polymethylmethacrylate, polystyrene and vinyl-chloride-acrylate copolymers.

6. The process of claim 1 wherein said water is present in the amount of about 4 parts per weight per one hundred parts of polyhydroxy compound.

7. The process of claim 1 wherein said flexible cellular product has a density of from 1 to 3 pounds per cubic foot.

8. In the process of preparing flexible cellular products from:
   a an organic polyisocyanate,
   b water and
   c a polyhydroxy compound having a molecular weight from about 1,000 to 6,000 and being selected from the group consisting of polyester polyols and polyether polyols; the steps which comprise (1) incorporating into the reaction mass, prior to the formation of the cellular product, from about 1 to 20 parts by weight per one hundred parts of polyhydroxy compound of polymer having a glass transition temperature of at least 50° C., said polymer being in the form of an unfoamed latex of up to about 65 percent solids content, said latex polymer having a particle size in the range of from about 200 to 800 angstroms, any other latex polymer particles outside said range being present in minor amounts, and (2) stripping part of the water from said unfoamed reaction mass prior to the formation of the cellular product.

9. The process of claim 8 wherein said polymer is selected from the group consisting of polymethylmethacrylates, polystyrene and vinyl-chloride-acrylate copolymers.

10. The process of claim 8 wherein said water is present in the amount of about 4 parts by weight per one hundred parts of polyhydroxy compound.

11. The process of claim 8 wherein the density of said flexible cellular product is between 1 to 3 pounds per cubic foot.

* * * * *

UNITED STATES PATENT OFFICE
CERTIFICATE OF CORRECTION

Patent No. 3,755,211    Dated August 28, 1973

Inventor(s) Hubert J. Fabris and Edwin M. Maxey

It is certified that error appears in the above-identified patent and that said Letters Patent are hereby corrected as shown below:

Column 2, line 57, which reads: "POLYURETHANES" should read ---POLYURETHANES---.

Column 4, line 63, which reads: "transistion" should read ---transition---.

Column 7, line 45, which reads under Sample D: "1.411.67" should read under Sample D ---1.67--- and under Sample E ---1.41---.

Column 7, line 66, which reads: "16° to 30°C." should read ---16°C. to 30°C.---.

Column 8, line 52, which reads: "stannous octoate 0.35" should read under Ingredients ---stannous octoate--- and under Sample H ---0.35---.

Column 8, line 60, which reads: "CLD laods" should read ---CLD loads---.

Column 8, line 64, which reads: "SAC factpr" should read ---SAC factor---.

Column 9, line 17, under Sample N, which reads: "o.35" should read ---0.35---.

Column 9, line 23, which reads: "TgX-64" should read ---Tg= -64---.

Column 9, line 35, which reads: "11.8" should be deleted and "11.8" should be added to Column 9, line 34, under Sample O

UNITED STATES PATENT OFFICE
CERTIFICATE OF CORRECTION

Patent No. 3,755,211          Dated August 28, 1973

Inventor(s) Hubert J. Fabris and Edwin M. Maxey

It is certified that error appears in the above-identified patent and that said Letters Patent are hereby corrected as shown below:

Column 9, lines 46, 47 and 48, Claim 1, which reads: "a b c" should read ---(a) (b) (c)---. The parentheses should be added so as to make it easier to read.

Column 10, lines 27, 28, and 29, Claim 8, which reads: "a b c" should read ---(a) (b) (c)---. The parentheses should be added so as to make it easier to read.

Signed and sealed this 1st day of January 1974.

(SEAL)
Attest:

EDWARD M. FLETCHER, JR.
Attesting Officer

RENE D. TEGTMEYER
Acting Commissioner of Patents

FO-1050
(5/89)

UNITED STATES PATENT OFFICE
CERTIFICATE OF CORRECTION

Patent No. 3,755,211                    Dated August 28, 1973

Inventor(s) Hubert J. Fabris and Edwin M. Maxey

It is certified that error appears in the above-identified patent and that said Letters Patent are hereby corrected as shown below:

Column 8, line 48, change "0.37%" to --0.63%--.

Column 9, after line 19 which reads:

"water                                  4.0      -       -       -"

add the following line:

--TDI 80/20 Isomer Ratio                52       52      52      52--

Signed and sealed this 10th day of September 1974.

(SEAL)
Attest:

McCOY M. GIBSON, JR.                    C. MARSHALL DANN
Attesting Officer                       Commissioner of Patents